June 7, 1960 — H. THOMASON — 2,939,254
BRAKE SHOE GRINDING EQUIPMENT
Filed Nov. 3, 1955 — 2 Sheets-Sheet 1

INVENTOR.
HJALMAR THOMASON
BY
Flamand Flann
ATTORNEYS.

June 7, 1960
H. THOMASON
2,939,254
BRAKE SHOE GRINDING EQUIPMENT
Filed Nov. 3, 1955
2 Sheets-Sheet 2
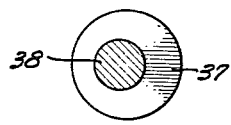
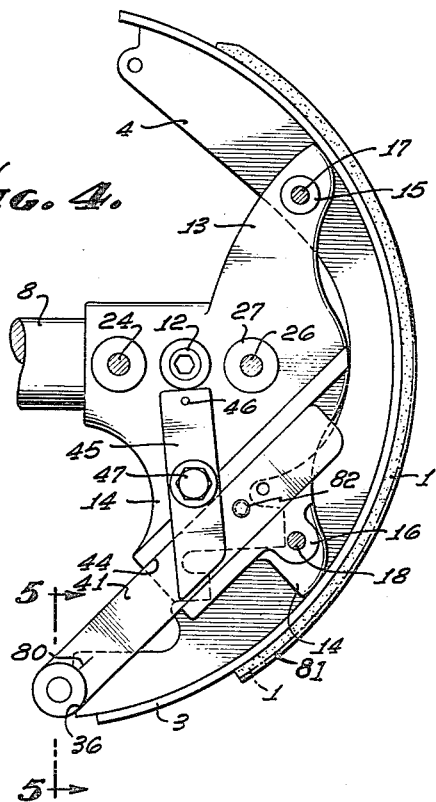
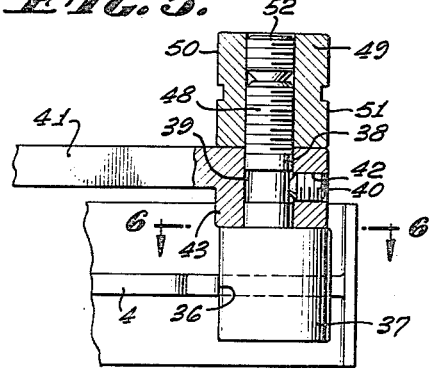
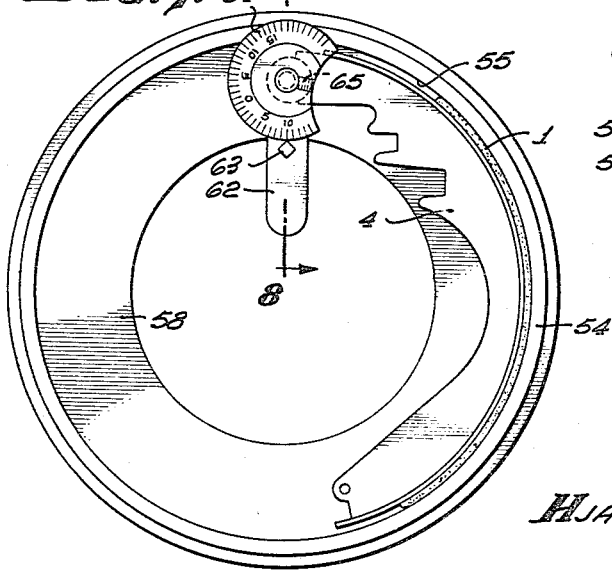
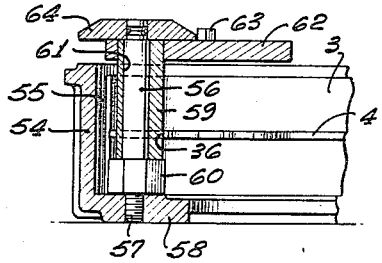
INVENTOR.
*HJALMAR THOMASON*
BY
*Flam and Flam*
ATTORNEYS.

United States Patent Office 2,939,254
Patented June 7, 1960

2,939,254
BRAKE SHOE GRINDING EQUIPMENT
Hjalmar Thomason, 2023 W. Gage Ave.,
Los Angeles, Calif.
Filed Nov. 3, 1955, Ser. No. 544,682
2 Claims. (Cl. 51—217)

This invention relates to grinding and brake shoe checking equipment for automobile brake shoes, and particularly of the type partly illustrated in Patent No. 2,543,387, issued on February 27, 1951 to Hjalmar Thomason.

The brake lining on automotive vehicles with self-energizing brakes such as, for example, with Bendix, does not wear the same on both shoes. The lining on the secondary shoe doing most of the work wears faster. Some automobile manufacturers in order to better balance the wear of the shoes use $\frac{3}{16}''$ lining on the primary and $\frac{15}{64}''$ on the secondary shoe. Both of these shoes in a brake, such as the Bendix, ride a common anchor. It is readily understood that inasmuch as those shoes cannot move up and down or radially on the anchor, they cannot be ground the same. If they would be, it would not be possible to adjust the brakes so that a uniform clearance of $\frac{10}{1000}''$ (which is more or less standard on Bendix brakes) is obtained.

One of the objects of this invention is to provide a shoe holding clamp that will permit a brake shoe to be held either on or off center while grinding so that a brake shoe with a thicker lining may be ground so it will work from a common anchor with a brake shoe that is provided with a thinner lining and still permit the brakes to be adjusted so that the clearance between both brake shoes and drums is the same. Automobile manufacturers are, furthermore equipping late model cars with fixed or non-adjustable anchors. This construction requires more accurate work on brake shoes. The construction of the clamp described meets these new conditions by making it possible to maintain an accuracy on brake work not practical with previously existing shoe holding clamps.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 4 is a sectional view, taken along a plane corresponding to line 4—4 of Fig. 2;

Fig. 5 is an enlarged sectional view, taken along a plane corresponding to line 5—5 of Fig. 4;

Fig. 6 is a detail sectional view taken along a plane corresponding to line 6—6 of Fig. 5;

Fig. 7 is a plan view of a gauge adapted to be utilized with the invention; and

Fig. 8 is a sectional view, taken along a plane corresponding to line 8—8 of Fig. 7.

Figure 1:
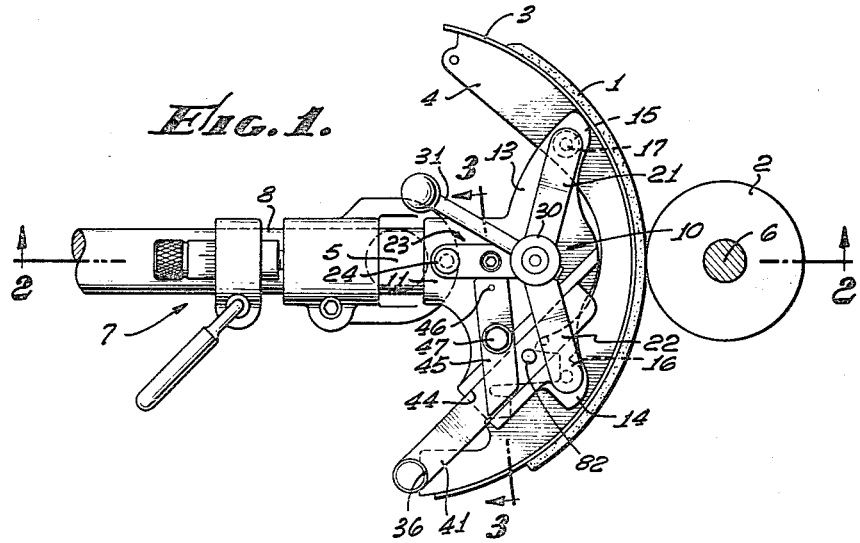
Figure 1 is a plan view of an embodiment of the invention.
Figure 2:
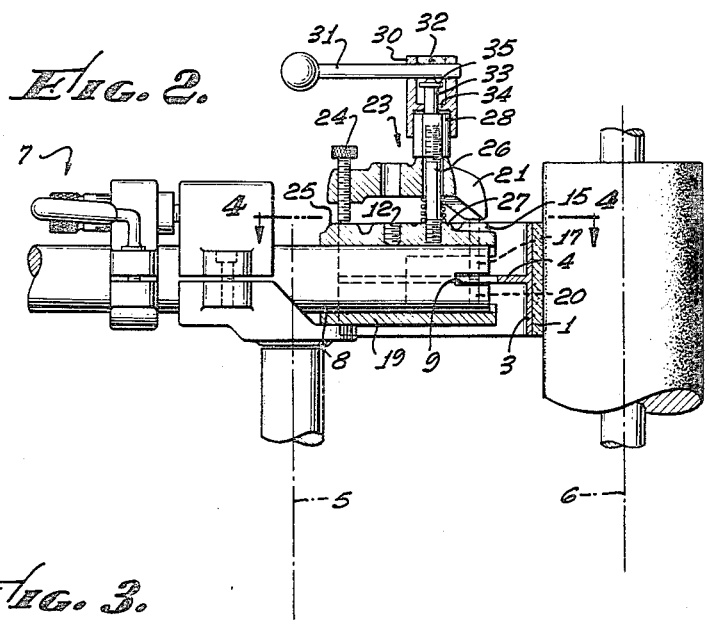
Fig. 2 is a sectional view, taken generally along a plane corresponding to line 2—2 of Fig. 1.

In order to grind a brake shoe lining 1 (Figs. 1, 2 and 4) accurately to fit the interior of a brake drum, use is made of a grinding wheel 2. In the present instance, this grinding wheel has a vertical axis 6.

The brake shoe lining 1 is shown as fixed to a brake shoe 3, having an intermediate web or flange 4.

The apparatus shown in Figs. 1 to 6, inclusive, is arranged to hold and clamp the brake shoe 3 and its flange 4 in firm position so that the lining 1 may be appropriately ground. For the grinding operation, the brake shoe is arranged to be angularly moved about a vertical axis 5 (Fig. 2), all as hereinbefore described in said prior patent.

The distance between this axis 5 and axis 6 determines the radius of the brake surface. This distance may be adjusted by appropriate mechanism cooperating to conform to the desired radius of curvature of the ground surface of the lining 1. By appropriate means indicated generally by the reference character 7, the brake shoe 3 may be fed toward the abrasive wheel 2 without altering the distance between the axes 5 and 6.

The clamp includes a supporting bar 8 that has a longitudinal direction of movement transverse to axes 5 and 6. This movement may be gradual, to cause the brake shoe 3 or lining 1 to be fed to the wheel 2.

At its right-hand end, the bar 8 is provided with a slot 9 into which the web or flange 4 of the brake shoe 3 may extend.

The remainder of the clamp structure 10 is adjustably mounted upon the bar 8. For this purpose, there is a hub 11 through which the bar 8 extends. This hub 11 may be held in any adjusted position with respect to the bar 8 by the aid of a headless set screw 12. This set screw 12 is threadedly engaged in a boss formed on the hub 11. The lower end of the screw 12 engages a flattened surface of the bar 8.

Integrally supported on the hub 11 are upper arms 13 and 14. These upper arms have ends adapted to contact the concave surface of the shoe 3. These arms are also provided with apertured bosses 15 and 16 serving to pass clamp pins 17 and 18 engaging the upper surface of the web or flange 4.

Similar arms 19 are also supported on the hub immediately opposed to and below the arms 13 and 14. These arms carry pins 20 engaging the lower surface of the web or flange 4. By the aid of the pins 17, 18 and 20, the flange 4 can be tightly clamped. The upper pins 17 and 18 have lower rounded ends and have clearance with respect to the apertures in the arms 13 and 14.

The clamping pins 17 and 18 are carried by arms 21 and 22 of a frog 23. This frog is arranged to be urged downwardly about a fulcrum provided by the lower end of an adjustable screw 24, so that the pins 17 and 18 may be urged downwardly against the web 4. Screw 24 is conveniently threaded through the left-hand portion of the frog 23 and rests upon the top of a boss 25 carried by the frog 23.

For urging the frog 23 downwardly to clamp the web 4, there is provided a post 26 which is firmly fixed at its lower end in the boss 27 carried by the hub 11. The upper end of the post 26 is threaded for engagement with a hexagonal nut 28. The post 26 passes through a clearance aperture in the frog 23.

For urging the nut 28 downwardly for clamping the web 4, a socket wrench 30 having a handle 31 is provided. This handle passes through the wrench 30 and has a cross pin 32 confining the handle 31.

The nut 28 has an integral reduced upper portion 33 passing through a restricted aperture in wall 34 carried internally of the socket wrench 30. A washer 35 is mounted on the end of the reduced portion 33. In this way the socket wrench may be moved upwardly out of cooperative engagement with the nut 28 when desired, for moving the wrench angularly to place handle 31 in a convenient angular position.

Figure 3:
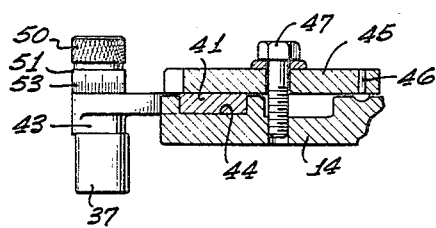
Fig. 3 is a sectional view, taken along a plane corresponding to line 3—3 of Fig. 1.

The position of the web 4 in relation to the clamp can be adjusted so that the brake shoe 3 is eccentric to the axis 5. For this purpose, the concave recess 36 provided at the lower edge of the web 4 is positioned against a post 37. This post may be of any desired shape providing a contact surface. In this instance, it is shown as cylindrical. This post, as shown most clearly in Figs. 3, 5 and 6, is mounted for adjustment on a stem 38 in relation to the axis of the stem. This stem 38 has a reduced portion 39 engaged by a set screw 40. Set screw 40 is threaded into a transverse threaded opening 42 in a hub 43 located at the end of an adjustable arm 41. This arm 41 is slidable in a groove 44 cut on the upper side of the arm 14; and it may be held in adjusted position by a clamp bar 45. This clamp bar 45 contacts the upper surface of the arm 41 and is provided with a pivot pin 46 having a rounded end engaging a recess in the upper surface of the arm 14. A clamping screw 47 engages the bar 45 and is threaded into the arm 14.

By this means the position of the arm may be adjusted to position the post 37. Furthermore, the post 37 has a threaded end 48 (Fig. 5) carrying a nut 49. This nut has a knurled upper end 50 and a smooth lower cylindrical portion 51 (Figs. 3 and 5). The nut 49 can be held in adjusted position with respect to the threaded end 48 by a headless set screw 52 threaded into the nut 49 and engaging the upper end of the threaded portion 48.

The cylindrical portion 51 carries a graduation or scale marks 53 permitting definite adjustment of the post 37 while the set screw 40 is released. After the adjustment is made, the set screw 40 may be tightened.

By a combination of adjustment of the arm 41 in the groove 44, and the eccentric adjustment of the post 37 by the aid of the nut 49, the eccentricity of the brake shoe 3 may be accurately adjusted in relation to the axis 5.

The concave surface formed by recess 36 conforms to a stationary anchor pin in the brake mechanism. The grinding effect therefore is such as to provide a non-uniform thickness of the brake lining 1 to conform to the brake requirements. This anchor pin, as is well understood, provides an axis for the brake shoe in its engaging or disengaging movements.

In inserting a brake shoe into the clamping apparatus, the bar 41 is loosened by releasing the clamp bar 45. The post 37 is placed in engagement with recess 36, and the post is turned by the aid of the knurled end to bring a desired graduation mark 53 to a stationary index line 80 (Fig. 4) marked on arm 46. The graduation marks 53 cooperating with line 80 indicate the degree of eccentricity of the brake shoe with respect to a circle 81 concentric with axis 5. This adjustment being completed, the brake shoe web 4 is moved until at least an end of one of the arms 13, 14, contacts the concave side of the shoe; then clamp bar 45 may be tightened, and the clamping frog 23 may be urged to clamping position. The grinding operation can now be performed.

If desired, the setting of bar 41 may be facilitated to comply with the requirements of a particular standard shoe. For this purpose, a removable index pin 82 may be used, apertures being provided in arm 14 to cooperate with any one of a number of apertures in the bar 41.

In order to provide a gauge to determine whether the brake shoe 3 and its lining 1 are accurately ground, a gauge structure illustrated in Figs. 7 and 8 is provided. The gauge structure is in the form of a hollow cylinder 54 having an internal surface 55 made to correspond to the size of the drum which the shoe is intended to fit. This may be a continuous or discontinuous cylindrical surface. Near the surface 55, a stationary pintle 56 is supported as by the aid of a threaded end 57 engaging the bottom rim 58 of the gauge 54. This pintle carries a member 59, the lower end of which rests upon the top of the non-circular base 60 formed on the pintle 56. This member 59 has a surface (which may be cylindrical) for engaging the end recess of a brake shoe web. Member 59 has an eccentric aperture 61, to make it possible to adjust the angular position of the engaging surface about the axis of the pintle 56. The exterior surface of this member or post 59 is adapted to engage the recess 36 of web 4; and the post 59 is rotated to produce exact conformity between the ground surface of the lining 1 and the interior cylindrical surface 55.

To facilitate the rotation of the post 59, a handle 62 is joined to the upper end of the post 59. Also carried by the post is a pointer 63 that cooperates with graduation marks on a stationary dial 64. This dial 64 and pointer 63 provide an indicator to show the angular adjustment of the post 59, and which adjustment is intended to conform to the setting of post 37 during the previous grinding operation.

The dial 64 is appropriately mounted on the upper end of the pintle 56 as by a set screw 65.

The deviation, if any, in the reading between the setting of scale 51 of the reading on dial 64 indicates the extent of the inaccuracy.

The inventor claims:

1. In a grinder clamp structure for holding a brake shoe with its lining while the lining is being ground, the clamp structure being angularly movable for effecting a grinding operation about a fixed axis, said brake shoe having a rib and an arcuate flange for supporting the lining, characterized by the provision of means for so positioning the shoe in the clamp structure as to provide a finished lining thicker at one end of the arcuate flange than at the other end of the flange, comprising a post having an axis parallel to said fixed axis and engaging a recess in one end of the rib; means for adjusting the position of the post with respect to said fixed axis; and means carried by the clamp structure for providing an abutment to contact the concave side of the flange for determining with the post, the position of the center of the arcuate flange with respect to the fixed axis, said post and abutment means being the sole means for positioning the shoe in the clamp structure.

2. In a grinder clamp structure for holding a brake shoe with its lining while the lining is being ground, the clamp structure being angularly movable for effecting a grinding operation about a fixed axis, said brake shoe having a rib and an arcuate flange for supporting the lining, characterized by the provision of means for so positioning the shoe in the clamp structure as to provide a finished lining thicker at one end of the flange than at the other end of the flange, comprising a post having an axis parallel to said fixed axis and engaging a recess in one end of the rib; means for adjusting the position of the post with respect to said fixed axis; said adjusting means including an eccentric mounting for the post so as to shift the axis of the post; and means carried by the clamp structure for providing an abutment to contact the concave side of the flange for determining with the post, the position of the shoe with respect to the fixed axis, said post and abutment means being the sole means for positioning the shoe in the clamp structure.

References Cited in the file of this patent

UNITED STATES PATENTS

| | | |
|---|---|---|
| 1,898,136 | Miller et al. | Feb. 21, 1933 |
| 2,289,693 | Blazek | July 14, 1942 |
| 2,304,530 | Bigelow | Dec. 8, 1942 |
| 2,345,161 | Thomason | Mar. 28, 1944 |
| 2,543,387 | Thomason | Feb. 27, 1951 |
| 2,553,525 | Burke et al. | May 15, 1951 |
| 2,644,281 | Thomason | July 7, 1953 |
| 2,715,799 | Billeter | Aug. 23, 1955 |
| 2,734,319 | Billeter | Feb. 14, 1956 |